United States Patent
Wang et al.

(10) Patent No.: US 10,073,851 B2
(45) Date of Patent: Sep. 11, 2018

(54) FAST NEW FILE CREATION CACHE

(71) Applicant: Apple Inc., Cupertino, CA (US)

(72) Inventors: Wenguang Wang, Santa Clara, CA (US); David A. Majnemer, Great Neck, NY (US); Deric S. Horn, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 13/736,817

(22) Filed: Jan. 8, 2013

(65) Prior Publication Data

US 2014/0195571 A1 Jul. 10, 2014

(51) Int. Cl.
- *G06F 12/00* (2006.01)
- *G06F 17/30* (2006.01)
- *G06F 3/06* (2006.01)

(52) U.S. Cl.
CPC ........ *G06F 17/30091* (2013.01); *G06F 3/068* (2013.01); *G06F 3/0685* (2013.01); *G06F 17/30132* (2013.01)

(58) Field of Classification Search
None
See application file for complete search history.

(56) References Cited

U.S. PATENT DOCUMENTS

| | | | |
|---|---|---|---|
| 6,016,530 A | 1/2000 | Auclair et al. | |
| 6,598,134 B2 | 7/2003 | Ofek et al. | |
| 6,804,763 B1 | 10/2004 | Stockdale et al. | |
| 7,225,211 B1 * | 5/2007 | Colgrove | G06F 17/30221 707/693 |
| 7,310,699 B2 | 12/2007 | Sinclair | |
| 7,464,222 B2 | 12/2008 | Matsunami et al. | |
| 7,555,575 B2 | 6/2009 | Kaneda | |
| 7,788,220 B1 | 8/2010 | Auchmoody et al. | |
| 7,908,236 B2 | 3/2011 | Modha et al. | |
| 8,010,747 B2 | 8/2011 | van Riel | |
| 8,296,510 B2 | 10/2012 | Radke et al. | |
| 8,463,825 B1 * | 6/2013 | Harty | G06F 17/30233 707/813 |
| 8,639,872 B1 * | 1/2014 | Boyle | G06F 12/0871 711/103 |
| 8,732,424 B2 | 5/2014 | Lee et al. | |
| 8,751,725 B1 * | 6/2014 | Gangadharan et al. | 711/100 |
| 9,477,431 B1 * | 10/2016 | Chen | G06F 3/0689 |
| 2003/0005223 A1 | 1/2003 | Coulson et al. | |

(Continued)

OTHER PUBLICATIONS

Jiang, Song et al., "CLOCK-Pro: An Effective Improvement of the CLOCK Replacement", In Proceedings of USENIX Annual Conference, (2005), 14 pages.

*Primary Examiner* — David T. Brooks
(74) *Attorney, Agent, or Firm* — Womb Bond Dickinson (US) LLP

(57) ABSTRACT

In one embodiment, a new file creation cache is reserved on a fast storage device that is part of a composite storage device that also includes a slow storage device; the composite storage device is treated as a single logical volume (or a plurality of logical volumes) by a file system which maintains a mapping table that is used to determine whether the write operation is for a new file. If the write operation is for a new file, the file system attempts to write the new file to the fast storage device. If the write operation is not for a new file, the mapping table specifies which device is used for the write operation.

18 Claims, 5 Drawing Sheets

(56) References Cited

U.S. PATENT DOCUMENTS

| | | | |
|---|---|---|---|
| 2003/0056058 A1 | 3/2003 | Veitch | |
| 2004/0044861 A1 | 3/2004 | Cavallo et al. | |
| 2004/0225835 A1* | 11/2004 | Coulson | G06F 3/0613 711/114 |
| 2005/0097287 A1* | 5/2005 | Melament | G06F 11/1456 711/162 |
| 2007/0061539 A1* | 3/2007 | Nonaka | G06F 3/0607 711/170 |
| 2007/0106842 A1* | 5/2007 | Conley et al. | 711/113 |
| 2007/0168627 A1 | 7/2007 | In et al. | |
| 2008/0027905 A1* | 1/2008 | Jensen | G06F 3/0613 |
| 2008/0215834 A1* | 9/2008 | Dumitru | G06F 3/0613 711/161 |
| 2008/0275928 A1* | 11/2008 | Shuster | G06F 3/0607 |
| 2008/0288714 A1* | 11/2008 | Salomon | G06F 3/0608 711/103 |
| 2009/0089343 A1* | 4/2009 | Moore | G06F 3/0608 |
| 2009/0276588 A1* | 11/2009 | Murase | G06F 3/0608 711/160 |
| 2010/0037009 A1* | 2/2010 | Yano | G06F 12/0246 711/103 |
| 2010/0082936 A1 | 4/2010 | Hobbet et al. | |
| 2010/0325352 A1* | 12/2010 | Schuette | G06F 3/0613 711/103 |
| 2010/0332725 A1 | 12/2010 | Post et al. | |
| 2010/0332730 A1 | 12/2010 | Royer et al. | |
| 2011/0035548 A1* | 2/2011 | Kimmel | G06F 3/061 711/114 |
| 2011/0082967 A1* | 4/2011 | Deshkar et al. | 711/103 |
| 2011/0138112 A1* | 6/2011 | Chiang et al. | 711/103 |
| 2011/0145489 A1* | 6/2011 | Yu et al. | 711/103 |
| 2011/0153931 A1* | 6/2011 | Bell, Jr. | G06F 3/0611 711/114 |
| 2011/0179219 A1* | 7/2011 | Ma et al. | 711/103 |
| 2011/0276744 A1 | 10/2011 | Sengupta et al. | |
| 2011/0283035 A1* | 11/2011 | Sutardja | G06F 3/0626 710/305 |
| 2011/0283045 A1 | 11/2011 | Krishnan et al. | |
| 2012/0017043 A1 | 1/2012 | Aizman et al. | |
| 2012/0059972 A1* | 3/2012 | Chen | G06F 12/0246 711/4 |
| 2012/0096217 A1* | 4/2012 | Son et al. | 711/103 |
| 2012/0166749 A1* | 6/2012 | Eleftheriou | G06F 3/0616 711/165 |
| 2012/0297117 A1* | 11/2012 | Jo | G06F 12/0246 711/103 |
| 2013/0031298 A1 | 1/2013 | Tan et al. | |
| 2013/0046920 A1* | 2/2013 | Ryu et al. | 711/103 |
| 2013/0060999 A1* | 3/2013 | Chiu et al. | 711/118 |
| 2013/0080703 A1* | 3/2013 | Kumagai et al. | 711/117 |
| 2013/0159597 A1* | 6/2013 | Cheong | G06F 12/0638 711/102 |
| 2013/0219116 A1 | 8/2013 | Wang et al. | |

* cited by examiner

FAST NEW FILE CREATION CACHE

BACKGROUND

This disclosure relates to the field of file systems and storage systems that operate with file systems.

File systems are used by data processing systems to manage the storage of data, such as a user's data files and files for application programs (including executable software) and files for an operating system (including executable software). A file system maintains one or more data structures that allow it to keep track of where data is stored on a storage device, such as a magnetic hard drive. These data structures are used when a read request or a write request is made by, for example, an application program or one or more components of the operating system. File systems can also be used with a composite storage device that includes two types of storage devices that together are treated as a single logical storage volume. U.S. patent application Ser. No. 13/605,916, filed Sep. 6, 2012 (entitled: Data Migration For Composite Non-Volatile Storage Device) describes examples of composite storage devices, and this prior application is incorporated hereby by reference.

SUMMARY OF THE DESCRIPTION

This disclosure describes methods for operating a composite storage device when a new file is being created in a file system. The composite storage device, in one embodiment, is treated as a single logical volume by the file system but includes two separate devices: a fast storage device (such as flash memory, which is a form of an electrically erasable semiconductor memory) and a slow storage device (such as a magnetic spinning disk drive). A method in one embodiment attempts to write a new file to the fast storage device and the method attempts to keep some space free on the fast storage device in order to create (e.g. store or record) new files into the space that is free. In one embodiment, a mapping table is used to map a logical address from a file system to a physical address on one of the fast or slow storage devices. By representing, in one embodiment, the free space of the logical volume as "holes" in the mapping table, this mapping table can be used to determine whether a write operation is for a new file or an existing file. If the write operation specifies a logical address that is for an existing location (in the composite storage device) that is currently occupied by an existing file, then the write operation is not for a new file (so in this case an existing file is to be overwritten at its existing location by the write operation); on the other hand, if the write operation specifies a logical address that maps to an empty (free) location, such as one of the "holes", in the mapping table, then the write operation is for a new file and this causes the method to attempt to write the new file to the free, available space on the fast storage device. The writing of the new file onto the fast storage device will normally occur unless there is insufficient space on the fast storage device, and if there is insufficient space, then the mapping table will normally allocate the file to a storage location on the slow storage device and write the new file to that allocated space on the slow storage device. The method also includes, in one embodiment, one or more operations that repeatedly attempt to keep a reserved portion (of free space) available on the fast storage device to receive writings of new files.

A method, according to one embodiment, for operating a composite storage device, that is treated as one or more logical volumes, can include the following operations: maintaining a mapping table which maps a logical address, that can be specified by a file system, for the one or more logical volumes to a physical address of one of the fast or the slow non-volatile storage devices; receiving a request for a write operation having data to be written to the one or more logical volumes and determining if the write operation is for a new file in the file system; writing the data for the write operation to one or more portions of the fast non-volatile storage device in response to determining that the write operation is for a new file and in response to determining that the fast non-volatile storage device has sufficient available space; determining from the mapping table whether to write the data for the write operation to one of the fast or the slow non-volatile storage devices in response to determining that the write operation is not for a new file; and writing the data for the write operation to the fast or the slow non-volatile storage device as specified by the mapping table in response to determining that the write operation is not for a new file. The method, in one embodiment, can also include the following operation: determining whether tree space on the fast non-volatile storage device is less than a value (such as a predetermined storage space measured in gigabytes) and moving data from the fast non-volatile storage device to the slow non-volatile storage device if the free space is less than the value in order to reserve some free space for new file creation on the fast storage device. The method, in one embodiment, can also include storing the mapping table on the fast storage device. In one embodiment, the fast non-volatile storage device is an electrically erasable semiconductor memory and the slow non-volatile storage device is a magnetic hard drive. In one embodiment, the composite storage device is treated by the file system as only a single logical volume. The method, in one embodiment, can delete an existing file after the new file is written to the fast storage device when the new file is a revised version of the existing file.

The embodiments described herein also include data processing systems that can perform the one or more methods described in this disclosure and can also include machine readable non-transitory storage media that can store executable computer program instructions that, when executed by a data processing system cause the system to perform one or more methods described in this disclosure.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Various embodiments are illustrated by way of example, and not limitation, in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
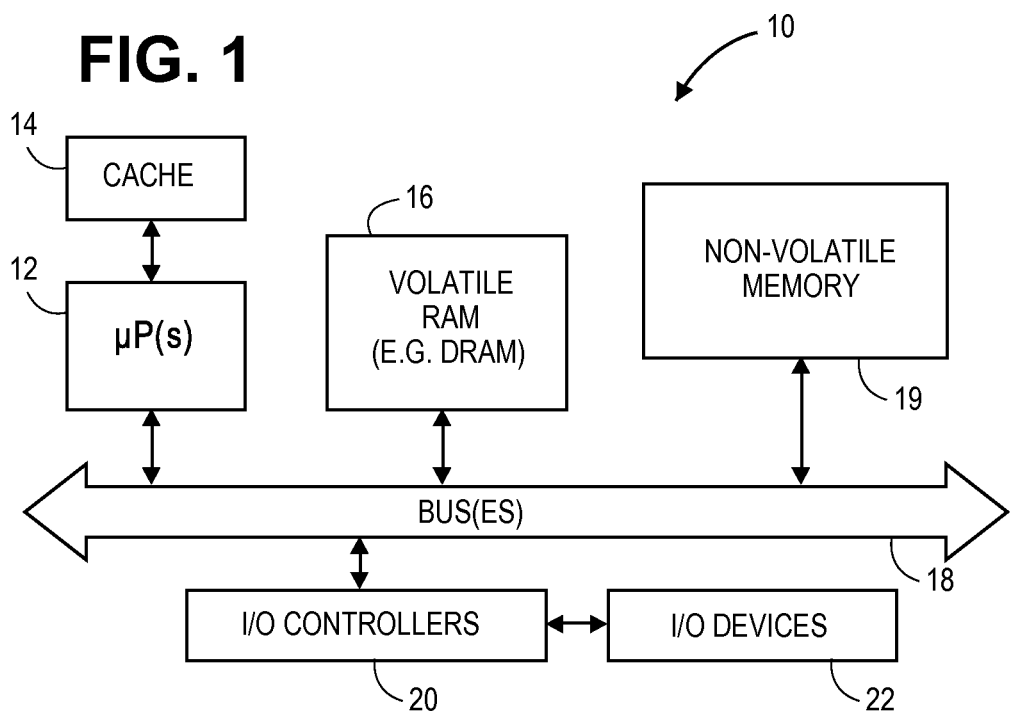
FIG. 1 shows an example of a data processing system which can be employed with an embodiment described herein.

FIG. 1 shows an example of a computing system 10, which is a form of a data processing system, which can be employed with one or more embodiments described herein. The system 10 can be a desktop computer system or a laptop computer system or a Smartphone, or some other electronic devices or consumer electronic devices. The system 10 can include one or more microprocessors or other logic units 12 coupled to an optional cache 14 which in one embodiment can be SRAM, as is known in the art. The one or more microprocessors 12 are coupled to the rest of the system through one or more buses 18, which couple the one or more microprocessors 12 to main memory, which can be volatile RAM 16. In one embodiment, volatile RAM can be the conventional DRAM used in computer systems, where the DRAM is coupled through the bus to the rest of the components in the system 10. The system 10 can also include one or more input/output controllers 20, which couple one or more input/output devices 22 to the rest of the system through the one or more buses 18. The system 10 also includes a non-volatile memory 19 which can be a composite disk, such as a combination of flash memory, which is a form of a solid state, drive and a conventional magnetic hard drive. The non-volatile memory 19 is, in one embodiment, a machine readable non-transitory storage medium which stores data (e.g. user files) and executable computer program instructions (e.g. file system software and operating system software and user application programs).

Figure 2:
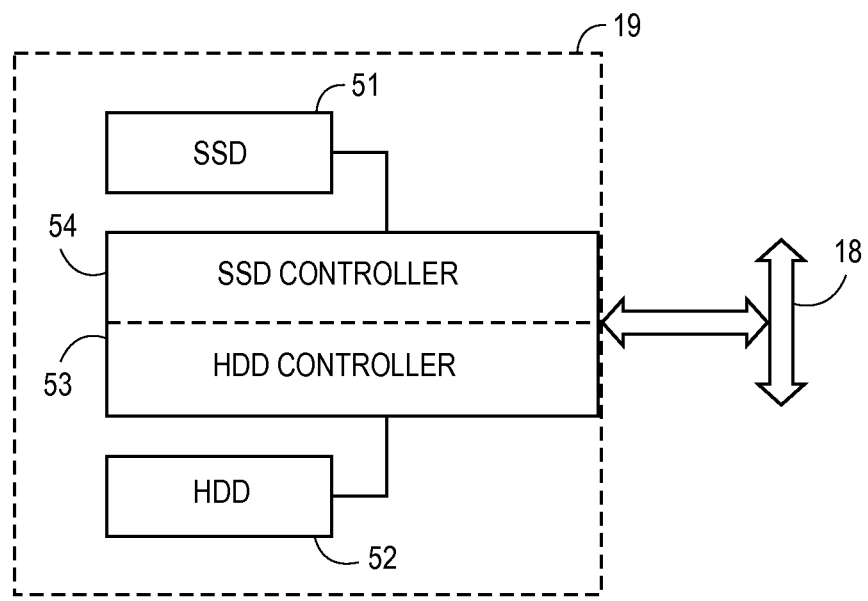
FIG. 2 shows an example of a composite non-volatile storage device-according to one embodiment.

FIG. 2 shows an example of a composite disk according to one embodiment. The non-volatile memory 19 includes a solid state drive 51 and a magnetic hard drive 52 which together can be treated as a single logical volume, or block device by a file system and an operating system and are controlled by one or more controllers, such as controller 54 which includes a solid state drive controller, and controller 53 which includes a hard disk drive controller. The one or more controllers couple the composite drive shown in FIG. 2 to the rest of the components in system 10 through the bus 18. It will be appreciated that flash memory (e.g., an electrically erasable semiconductor memory) is one form of a fast non-volatile storage device and that other fast storage devices can alternatively be used in conjunction with a slower storage device which can be a conventional magnetic hard drive or other non-volatile storage devices which are slower than the faster storage device. It will be understood that in this description a reference to SSD or HDD will be construed to mean the faster and the slower non-volatile storage devices respectively and will not be construed as being limited to, or specific to any storage device technology. In an alternative embodiment, the non-volatile memory 19 can be partitioned into multiple logical volumes.

Figure 3A:
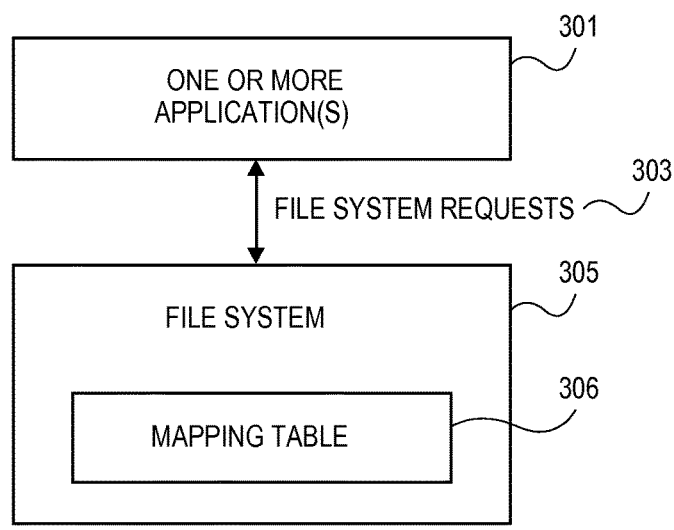
FIG. 3A shows an example of a software architecture in which one or more described embodiments can be implemented.

FIG. 3A shows an example of a software architecture that can be used with a composite storage device. One or more applications 301 can provide file system requests 303 to a file system 305 that can maintain a mapping table 306. The one or more applications 301 can be a set of user application computer programs or a set of operating system computer programs or a combination of programs in both of these sets; the file system 305 can be considered part of an operating system. The hierarchical file system plus (HFS+) used on Macintosh computers from Apple Inc. is an example of a file system which manages the storage and retrieval of files in a data processing system. The management of the storage and retrieval of files, through file system 305, can be a result of write operation requests or read operation requests from the one or more applications 301, and these requests can be part of file system requests 303. In one embodiment, an exposed API (Application Programming Interface) is used by each of the one or more applications to make calls to the file system for write operations and for read operations, and these calls are part of the file system requests 303 in one embodiment. For example, a word processing user application computer program can make a call to retrieve (e.g. read operation) a user's word processing document, which is a file, and receives the user's edits of the file and then save the user's edits in a write operation through another call that specifies the write operation. The write operation can specify the name of the file and/or other identifiers of the file (such as a persistent file number identifier that does not change even after the file changes or the file's name changes). The file name or other file identifier can be used to map to a logical address for the file, and this logical address is in turn mapped to a physical address (on the composite storage device) for the file. In one embodiment, a mapping table 306 can be used to perform the mapping operations which allow the file system 305 to keep track of the various files stored in the composite storage device, such as the composite storage device shown in FIG. 2.

Figure 3B:
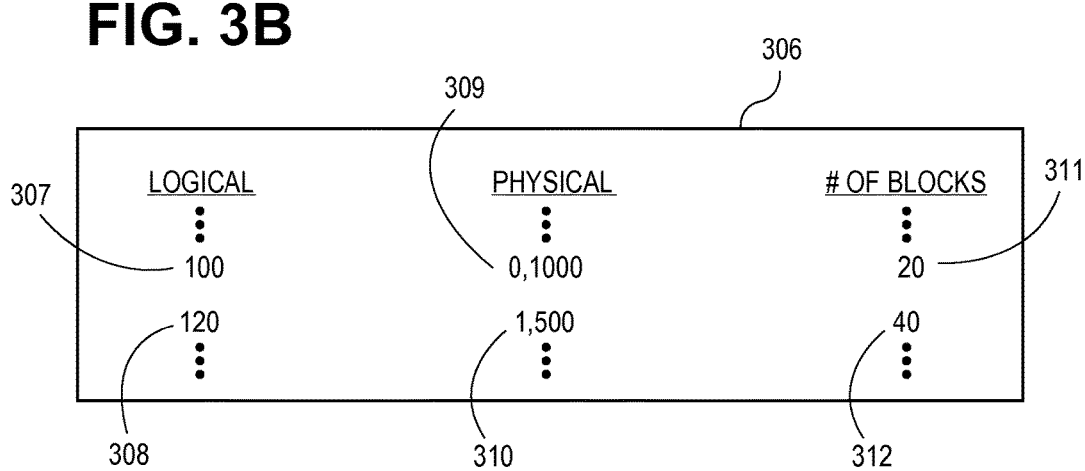
FIG. 3B shows an example of a data structure that can be used with one or more described embodiments, and in particular shows an example of a mapping table that can be used with those embodiments.

FIG. 3B shows some details of a portion of a mapping table 306 according to one embodiment; the mapping table can be used and maintained by the file system in order to manage storage and retrieval of one or more files. A file system in a data processing system can have thousands of files, and metadata for each of these files can be maintained in a data structure such as mapping table 306 so that the file system 305 can manage the storage and retrieval of those files. For example, file system 305 can use mapping table 306 when performing the methods shown in FIGS. 4 and 5. Metadata for two files is shown in the mapping table 306 in FIG. 3B; this metadata for each file includes a logical address, such as logical address 307 for one file and logical address 308 for another file, a physical address (such as physical address 309 for the one file and physical address 310 for the other file) for each corresponding logical address and a block number, such as block number 311 for the one file and block number 312 for the other file, which specifies the number of physical blocks that the corresponding file occupies on one of the two storage devices in the composite storage device. It will be understood that larger files will occupy more space on a given storage device and hence larger files will occupy more blocks. It will also be appreciated that mapping table 306 can include more metadata for each file; in alternative embodiments, mapping table 306 can express the information in other ways than shown in FIG. 3B. For each file, the logical address can be mapped to the file's name and/or other identifier for the file (e.g. a persistent file identifier number or character string) and this logical address is mapped through the table to the physical address for the file. In the embodiment shown in FIG. 3B, the physical address includes a device identifier (device identifier "0" in physical address 309 and device identifier "1" in physical address 310) which identifies the specific storage device in the composite storage device that stores the file. For example, device identifier 0 can specify that the file at logical address 307 is stored on SSD 51 (in FIG. 2) with a starting physical address of 1000 on SSD 51 (and occupies 20 blocks on SSD 51). Similarly, device identifier 1 can specify that the file at logical address 308 is stored on HDD 52 with a starting physical address of 500 on HDD 52 (and occupies 40 physical blocks on HDD 52). It will be appreciated that the size of a block on the two storage devices can be different; for example, HDD 52 can have a block size (for its blocks) that is larger than a block size of the blocks on SSD 51.

Figure 4:
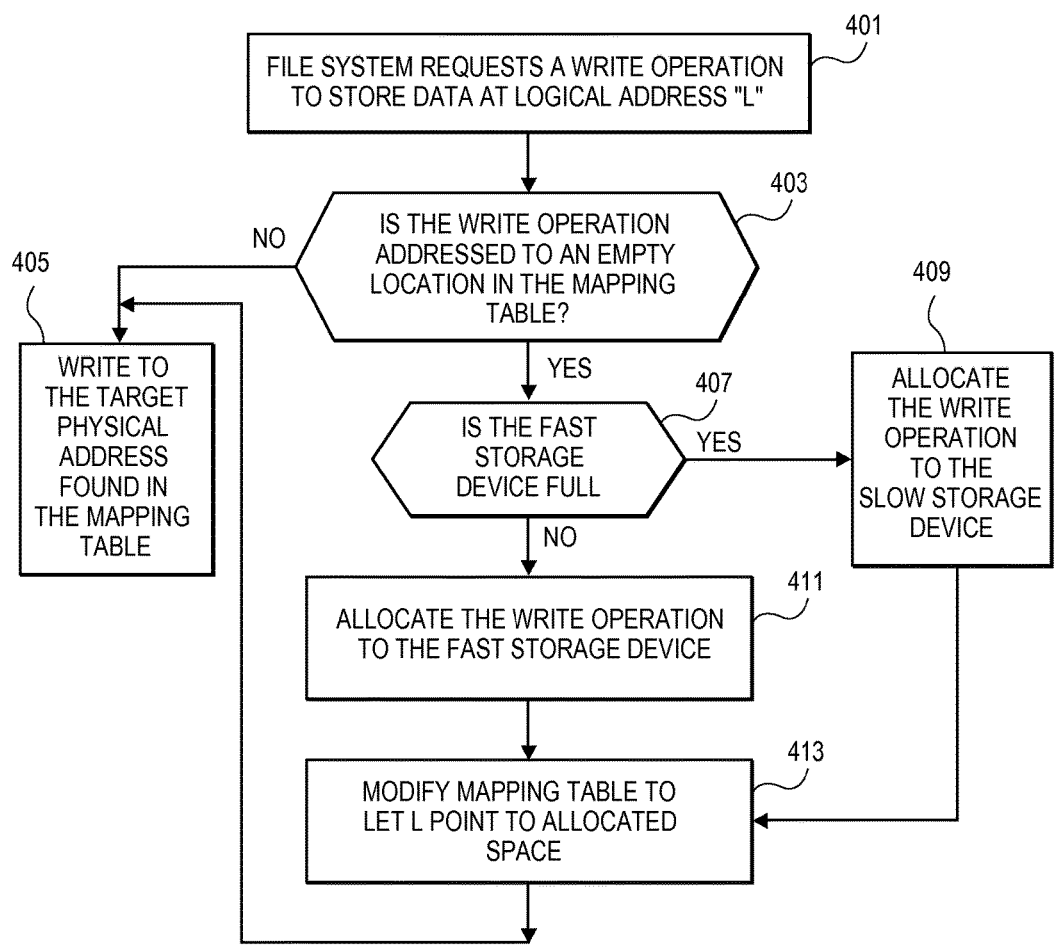
FIG. 4 is a flowchart that shows an example of an embodiment described herein.

The mapping table 306 can be used in various embodiments described herein for attempting to write new files to the faster storage device (e.g. SSD 51) in the composite storage device, and FIG. 4 shows an example of a method of such embodiments. In operation 401, a file system, such as file system 305, receives a request for a write operation to store data at a logical address (represented by "L"). This request can come in a call through an exposed file system API, from an application program (such as application program 301), and the call can specify the logical address (or a filename and/or other identifier to identify the file which is in turn mapped by the file system to the logical address) and the call can specify the write operation and optionally other parameters. In operation 403, the data processing system determines whether the requested write operation is addressed to an empty (free) location in the mapping table; this operation 403 effectively determines whether the write operation is for the creation (recording) of a new file. If operation 403 returns a false ("No"), then the write operation is not for a new file and hence operation 405 follows operation 403, and in operation 405, the system obtains the physical address(es) for the existing file from the mapping table (e.g. mapping table 306) and writes the data to the targeted physical addresses derived from logical address "L". In this path (from 403 directly to 405), the mapping table determines which storage device in the composite storage device receives the write operation; for example, in the case of a write operation for the file at logical address 308 in FIG. 3B, the mapping table will determine that the write operation is to be performed starting at physical address 500 on device "1" in the composite storage device, which can be HDD 52. If operation 403 returns a true ("yes"), then the data processing system determines, in operation 407, whether the fast storage device (e.g. SSD 51) is full (or otherwise has insufficient free space to store the file in the write operation requested in 401). Operation 407 can involve comparing a file size of the file to the available free space of fast storage device, and if the file size exceeds the available free space then operation 407 returns a true ("yes") in which case operation 409 follows operation 407 and allocates the write operation to the slow storage device and then operation 413 follows operation 409. If operation 407 returns a false ("No") result, then operation 411 follows operation 407 and operation 411 allocates the write operation to the fast storage device and then operation 413 follows operation 411. In operation 413, the mapping table is updated to let the logical address ("L") for the write operation be mapped to point to the allocated space having one or more physical addresses (on either the fast storage device if allocated in operation 411 or the slow storage device if allocated in operation 409). Then operation 405 follows operation 413 and the write operation to the target physical address, specified in the mapping table, is performed in operation 405. If the path to operation 405 is through operations 407, 411, and 413 then the write operation will store the new file on the fast storage device; on the other hand, if the path to operation 405 is through operations 407, 409, and 413, then the write operation will store the new file on the slow storage device.

Figure 5:
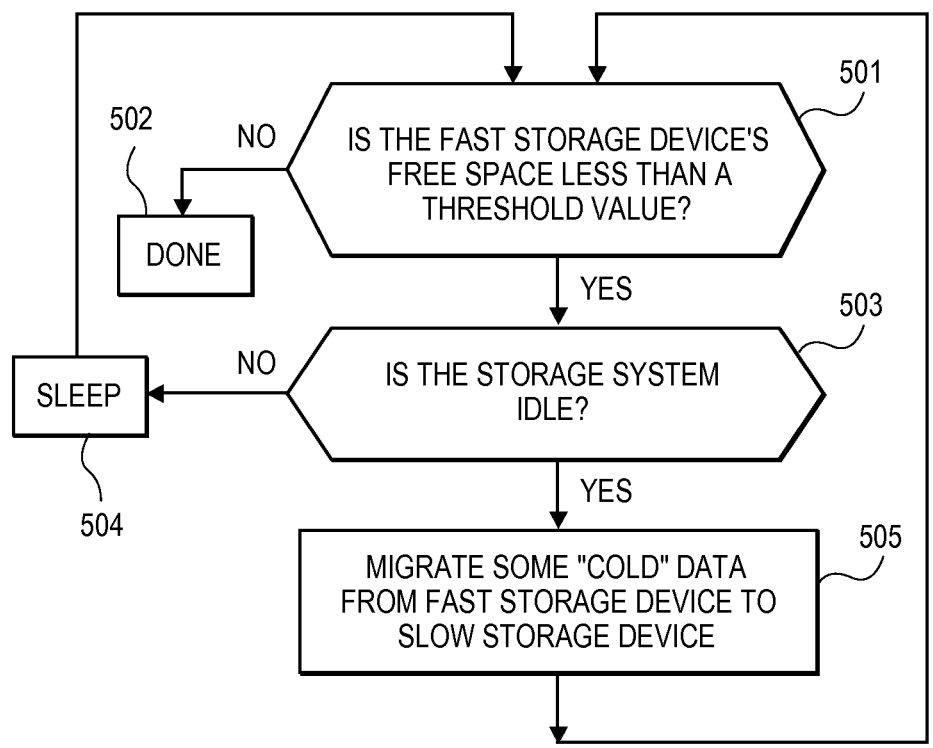
FIG. 5 is a flowchart that shows an embodiment of a method described herein.

The operations shown in FIG. 4 will tend, over time, to fill the fast storage device with new files, and if new file creation is common, the fast storage device could quickly become too full. One embodiment attempts to prevent the fast storage device from becoming too full by, in effect, attempting to reserve or otherwise allocate free space (available for new file creation) on the fast storage device. FIG. 5 shows an example of a method of such an embodiment. The method shown in FIG. 5 can be performed repeatedly over time at either fixed, periodic intervals or randomly over time or in other ways over time or can be invoked in response to a request to free space (based on storage levels in the fast storage device). When the method in FIG. 5 is invoked, operation 501 determines whether the free space (e.g. the empty or unused space) on the fast storage device (e.g. SSD 51) of the composite storage device is less than a threshold value, which can be a predetermined, fixed value or can be a dynamically adjusted value based on file system activity (such as the amount of new file creation over a given period of time). The threshold value can be related to (e.g., same size as) a desired amount of free space for new file creation. If operation 501 returns a false ("No"—the free space is greater than the threshold) the method ends in operation 502 and awaits to be invoked again at some point in time in the future, to thereby repeat operation 501. If operation 501 returns a true ("yes"—the free space is less than the threshold), the method proceeds to operation 503 in which it is determined whether the composite storage system is idle. If it is not idle (operation 503 returns a false "no"), then the method goes to sleep (operation 504) to be invoked again at some point in time in the future, to thereby repeat operation 501. The sleep operation 504 can finish whenever the composite storage system becomes idle, or it can be a timer based sleep that causes the method of FIG. 5 to be inactive for a timer based period of time, and when the timer expires, operation 501 is invoked again. If operation 503 determines the file system is idle (in other words, operation 503 returns a positive "yes"), then operation 505 can be performed to migrate "cold" or "older" or less used files from the fast storage device to the slow storage device. Various methods can be used to perform this migration, and U.S. patent application Ser. No. 13/605,916, filed Sep. 6, 2012, describes some of the methods for performing this migration, and this patent application is incorporated herein by reference. After a sufficient amount of migration has been performed to free up some space on the fast storage device, the method can return to a waiting state to be invoked again at some point in time in the future.

Numerous alternative embodiments can employ alternative methods, techniques or approaches. For example, the mapping table 306 can be managed jointly by the file system and the controller(s) for the composite storage device; in this case, the file system can specify the logical address and the controller(s) can control and specify the corresponding physical address(es). In an alternative embodiment, the composite storage device can have more than 2 different storage devices. In another alternative embodiment, the composite storage device can expose more than one logical volume to file systems and/or applications. For example, the composite storage device can be partitioned into multiple logical volumes. In another alternative embodiment the mapping table can use ranges for physical addresses so that block numbers do not need to be saved. Other alternative embodiments will be appreciated from this disclosure.

Figure 6:
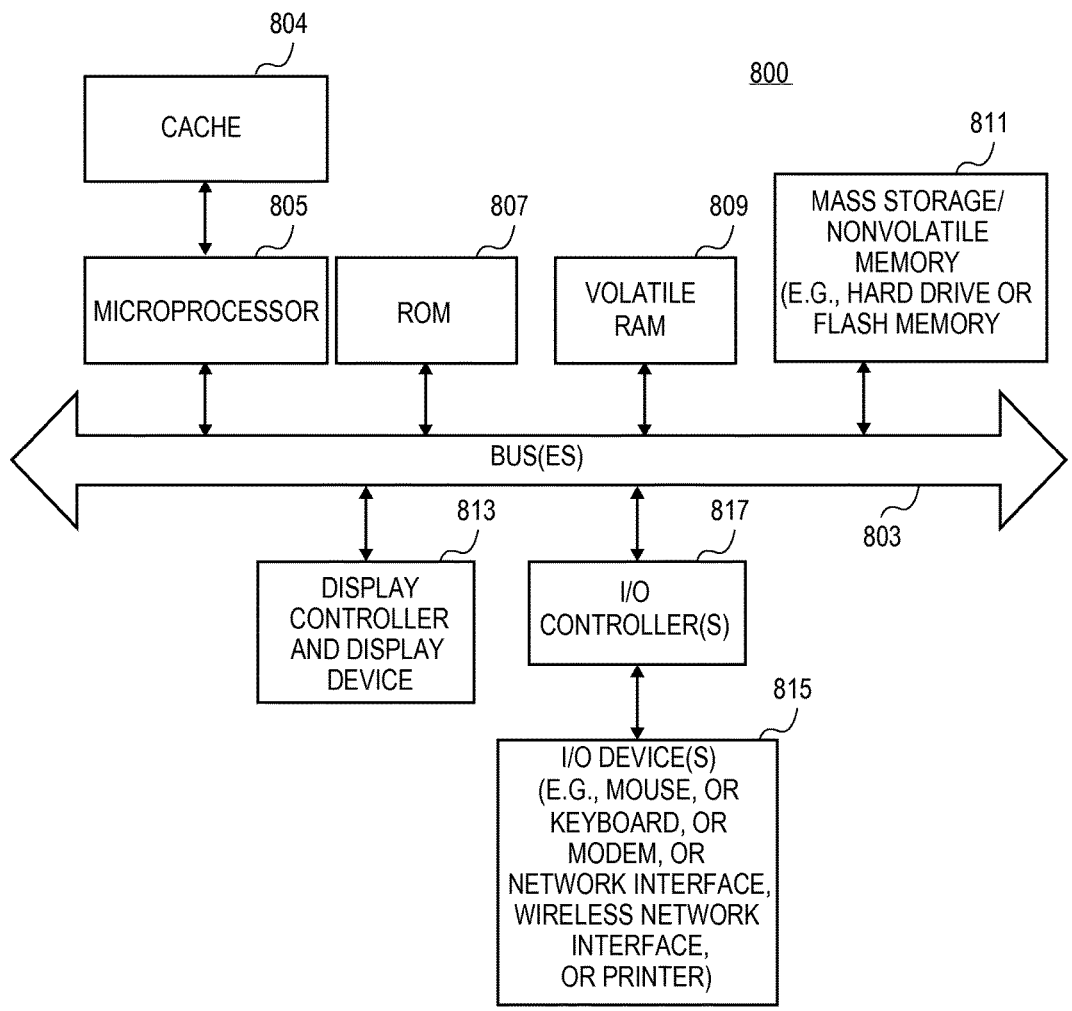
FIG. 6 shows an example of a data processing system that can use one or more embodiments described herein.

FIG. 6 shows one example of a data processing system, which may be used with one or more embodiments. Note that while FIG. 6 illustrates various components of a data processing system, it is not intended to represent any particular architecture or manner of interconnecting the components as such details are not germane to one or more embodiments. It will also be appreciated that network computers, tablet computers, and other data processing systems which have fewer components or perhaps more components may also be used with one or more embodiments.

As shown in FIG. 6, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 is coupled to optional cache 804. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. In one embodiment, the memory 811 can be the memory 19 which is a composite storage volume, treated as a single logical volume, that includes both a fast (e.g. flash) storage device and a slow (e.g. magnetic hard drive) storage device. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is in one embodiment a magnetic hard drive and a flash memory or other types of memory system which maintain data (e.g., large amounts of data) even after power is removed from the system. Typically, the mass storage 811 will also be a random access memory although this is not required. While FIG. 6 shows that the mass storage 811 is a local device coupled directly to the rest of the components in the data processing system, it will be appreciated that other embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

The data processing system shown in FIG. 6 may be a handheld computer, or a tablet computer such as an iPad or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or a consumer electronic device or other types of data processing systems which have fewer components or perhaps more components than that shown in FIG. 6.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine readable non-transitory storage medium storing executable computer program instructions which when executed by a data processing system cause the data processing system to perform a method for operating a non-volatile storage system which is treated as at least one logical volume and which is a composite system that includes a first non-volatile storage device operating at a first speed and a second non-volatile storage device operating at a second speed, wherein the first speed is faster than the second speed, the method comprising:

maintaining a mapping table which maps a logical address for the logical volume to a physical address of one of the first or the second non-volatile storage devices, the mapping table including one or more empty or free locations reserved for a new file to be written on the first non-volatile storage device and the logical address being specified by a file system;

receiving a request for a write operation having data to be written to the logical volume;

determining if the write operation is for a new file in the file system, wherein the write operation is determined to be for a new file when the write operation specifies the logical address in an empty or free location of the mapping table;

mapping one or more portions of the first non-volatile storage device to the logical address in the free or empty location of the mapping table in response to determining that the write operation is for a new file, wherein the one or more portions of the first non-volatile storage device include a reserved portion of free space to receive writes of new files, the reserved portion of free space associated with the one or more empty or free locations of the mapping table;

writing the data for the write operation to the one or more portions of the first non-volatile storage device; and determining whether an amount of free space on the first non-volatile storage device is less than a value and reserving space on the first storage device for new file creation by moving data from the first non-volatile storage device to the second non-volatile storage device in response to determining that the amount of free space is less than the value.

2. The medium as in claim 1 wherein the method further comprises:
determining from the mapping table whether to write the data for the write operation to one of the first or the second non-volatile storage device in response to determining that the write operation is not for a new file; and
writing the data for the write operation to a logical address associated with the first or the second non-volatile storage device as specified by the mapping table in response to determining that the write operation is not for a new file.

3. The medium as in claim 1 wherein the method further comprises:
storing the mapping table in the first non-volatile storage device.

4. The medium as in claim 1 wherein the write operation is determined not to be for a new file when the write operation specifies a logical address that is for an existing file that is to be overwritten in its existing location on one of the first or the second non-volatile storage device.

5. The medium as in claim 1 wherein the method further comprises:
mapping a physical address associated with the one or more portions of the first non-volatile storage device to an empty location between existing entries of the mapping table.

6. The medium as in claim 1 wherein the new file is a revised version of an existing file which is deleted after the new file is written to the first non-volatile storage device, and wherein the first non-volatile storage device is an electrically erasable semiconductor memory and the second iron-volatile storage device is a magnetic hard drive.

7. A data processing system comprising:
a processing system comprising at least a first processor;
a volatile memory storing at least a portion of an executing file system and an operating system;
a non-volatile memory which is a composite system treated as at least one logical volume by the file system and which comprises a first storage device operating at a first speed and a second storage device operating at a second speed, wherein the first speed is faster than the second speed;
wherein the processing system is configured to store and maintain a mapping table which maps a logical address for the logical volume to a physical address of one of the first and the second storage device, the mapping table including one or more empty or free locations reserved for a new file to be written on the first storage device and the logical address being specified by the file system;
wherein the mapping table is stored in the first storage device and one or more portions of the first storage device include a reserved portion of free space to receive writes of new files, the reserved portion of free space associated with the one or more empty or free locations of the mapping table;
wherein the processing system is configured to receive a request for a write operation for data to be written to the logical volume and is configured to determine whether the write operation is for a new file in the file system;
wherein the processing system is to determine that the write operation is for a new file when the write operation specifies the logical address in an empty or free location of the mapping table;
wherein the processing system is to map one or more portions of the first storage device to the logical address in the free or empty location of the mapping table in response to determining that the write operation is for a new file;
wherein the processing system is to write the data for the write operation to one or more portions of the first storage device in response to determining that the write operation is for a new file in the file system; and
wherein the processing system is to determine whether an amount of free space on the first storage device is less than a value and further to reserve space on the first storage device for new file creation by moving data from the first storage device to the second storage device in response to a determination that the amount of free space is less than the value.

8. The data processing system as in claim 7 wherein the processing system is to determine from the mapping table whether to write the data for the write operation to one of the first or the second storage devices in response to determining that the write operation not for a new file and the processing system is to cause writing of the data to a logical address associated with either of the first or the second storage devices as specified by the mapping table when the write operation is not for a new file.

9. The data processing system as in claim 7 wherein the write operation is determined not to be for a new the when the write operation specifies a logical address that is for an existing file that is to overwritten in its existing location on one of the first or the second storage device.

10. The data processing system as in claim 9 wherein the new file is a revised version of an existing file which is deleted after the new file is written to the first storage device, and wherein the first storage device is an electrically erasable semiconductor memory and the second storage device is a magnetic hard drive.

11. A method for operating a non-volatile storage system which is treated as at least one logical volume and which is a composite system that includes a first non-volatile storage device operating at a first speed and a second non-volatile storage device operating at a second speed, wherein the first speed is faster than the second speed, the method comprising:
maintaining a mapping table which maps a logical address for the logical volume to a physical address of one of the first or the second non-volatile storage devices, the mapping table including one or more empty or free locations reserved for a new file to be written on the first non-volatile storage device and the logical address being specified by a file system, wherein the one or more portions of the first non-volatile storage device include a reserved portion of free space to receive writes of new files, the reserved portion of free space associated with empty or free locations of the mapping table, and reserving space on the first storage device for new file creation includes reserving an additional amount of space in the reserved portion of free space in response to determining that the amount of free space in the reserved portion of free space is less than a value;
receiving a request for a write operation having data to be written to the logical volume;
determining if the write operation is for a new file in the file system, wherein the write operation is determined to be for a new file when the write operation specifies a logical address in an empty or free location of the mapping table;

mapping one or more portions of the first non-volatile storage device to the logical address in the free or empty location of the mapping table in response to determining that the write operation is for a new file;

writing the data for the write operation to the one or more portions of the first non-volatile storage device; and determining whether an amount of free space on the first non-volatile storage device is less than the value and reserving space on the first non-volatile storage device for new file creation by moving data from the first non-volatile storage device to the second non-volatile storage device in response to determining that the amount of free space is less than the value.

12. The method as in claim 11 wherein the method further comprises:

determining from the mapping table whether to write the data for the write operation to one of the first or the second non-volatile storage device in response to determining that the write operation is not for a new file; and writing the data for the write operation to a logical address associated with the first or the second non-volatile storage device as specified by the mapping table in response to determining that the write operation is not for a new file.

13. The method as in claim 11 wherein the method further comprises:

storing the mapping table in the first non-volatile storage device.

14. The method as in claim 11 wherein the write operation is determined not to be for a new rile when the write operation specifies a logical address that is for an existing file that is to be overwritten in its existing location on one of the first or the second non-volatile storage device.

15. The method as in claim 11 wherein the method further comprises:

mapping a physical address associated with the one or more portions of the first non-volatile storage device to an empty location between existing entries of the mapping table.

16. The method as in claim 15 wherein the new file is a revised version of an existing file which is deleted after the new file is written to the fast first non-volatile storage device, and wherein the first non-volatile storage device is an electrically erasable semiconductor memory and the second non-volatile storage device is a magnetic hard drive.

17. A data processing system having a non-volatile storage system which is treated as at least one logical volume and which is a composite system that includes a first non-volatile storage device operating at a first speed and a second non-volatile storage device operating at a second speed, wherein the first speed is faster than the second speed, the data processing system comprising:

means for maintaining a mapping table which maps a logical address for the logical volume to a physical address of one of the first or the second non-volatile storage devices, the mapping table including one or more empty or free locations reserved for a new file to be written on the first non-volatile storage device and the logical address being specified by a file system, wherein the one or more portions of the first non-volatile storage device include a reserved portion of free space to receive writes of new files, the reserved portion of free space associated with the one or more empty or free locations of the mapping table;

means for receiving a request for a write operation having data to be written to the logical volume;

means for determining if the write operation is for a new file in the file system, wherein the write operation is determined to be for a new file when the write operation specifies the logical address in an empty or free location of the mapping table;

means for mapping the logical address in the free or empty location of the mapping table to one or more portions of the first non-volatile storage device in response to determining that the write operation is for a new file;

means for writing the data for the write operation to the one or more portions of the first non-volatile storage device; and means for determining whether an amount of free space on the first non-volatile storage device is less than a value and reserving space on the first storage device for new file creation by moving data from the first non-volatile storage device to the second non-volatile storage device in response to determining that the amount of free space is less than the value.

18. The data processing system as in claim 17, further comprising:

means for determining from the mapping table whether to write the data for the write operation to one of the first or the second non-volatile storage device in response to determining that the write operation is not for a new file; and means for writing the data for the write operation to a logical address associated with the first or the non-volatile storage device as specified by the mapping table in response to determining that the write operation is not for a new file.

* * * * *